United States Patent [19]
Lee

[11] Patent Number: 6,036,210
[45] Date of Patent: Mar. 14, 2000

[54] MODIFIED PRONE HANDCYCLE

[76] Inventor: David V. Lee, 1011 Genie La., Cardiff by the Sea, Calif. 92007

[21] Appl. No.: 09/070,397

[22] Filed: Apr. 30, 1998

Related U.S. Application Data

[60] Provisional application No. 60/051,829, Jul. 7, 1997.
[51] Int. Cl.[7] .................................................. B62K 5/04
[52] U.S. Cl. ...................... 280/250; 280/288.1; 280/282; 280/240
[58] Field of Search ............................... 280/242.1, 249, 280/250, 259, 260, 261, 270, 288.1, 240, 282

[56] References Cited

U.S. PATENT DOCUMENTS

| | | | |
|---|---|---|---|
| 592,169 | 10/1897 | Raymond | 280/259 |
| 1,518,037 | 12/1924 | Wilson . | |
| 3,042,131 | 7/1962 | Dorci | 280/242.1 |
| 3,361,224 | 1/1968 | McKim . | |
| 3,854,754 | 12/1974 | Jablonski . | |
| 3,981,516 | 9/1976 | Haggkvist | 280/263 |
| 5,022,671 | 6/1991 | Jones, Jr. . | |
| 5,354,084 | 10/1994 | Lofgren et al. | 280/250 |
| 5,383,676 | 1/1995 | Valentino . | |
| 5,853,184 | 12/1998 | Lofgren et al. | 280/242.1 |

*Primary Examiner*—Kevin Hurley
*Attorney, Agent, or Firm*—Christopher H. Hunter

[57] ABSTRACT

A handcycle supports a rider in a forward leaning ("modified prone") position, with the feet of the rider in straps above the rear axle, and the arms hanging generally downwardly toward a pedal assembly. The pedal assembly is generally at about the chest portion of the rider, which increases the leverage that can be applied to rotate the hand pedals, thereby increasing the speed of the bicycle. The central bar of the cycle frame extends upwardly and forwardly to support a rider at an angle of between about 15 and 45 degrees, and more preferably at an angle of about 30 degrees from the rear axle. Appropriate padding and supports can be provided along the mid-portion of the bar to support the chest of the rider at the proper angle. A damper assembly connected between the front fork and the frame of the cycle provides variation in dampening for front wheel stability in changing road conditions. The gear shift and brakes are also easily accessible. An adjustable pedal assembly allows alternating stroke capability as well as synchronous stroke.

21 Claims, 5 Drawing Sheets

MODIFIED PRONE HANDCYCLE

RELATED CASES

The present application claims priority to U.S. Provisional Application Ser. No. 60/051,829, filed Jul. 7, 1997.

FIELD OF THE INVENTION

The present invention relates generally to wheelchairs, and more particularly to a long-distance or racing handcycle, where the hands are used to provide the motive input for the cycle.

DESCRIPTION OF THE INVENTION

Recumbent-style handcycles currently on the market are designed as seated models, with legs in front, sometimes completely extended. A pedal assembly extends upwardly from the front forks and is supported at about the chest height of the rider. The rider grasps and rotates hand pedals mounted on the pedal assembly to cause the front wheel to rotate. Resort may be had to U.S. Pat. Nos. 5,022,671 and 5,383,676 for general descriptions of such recumbent-style handcycles.

It is believed that the known designs have certain aerodynamic limitations for racing and as such, have been impediments to wheelchair athletes. Known modifications have used the recumbent-style design as the basic configuration of frame, with improvements made in gearing and materials. Attempts have also been made to reduce the weight of the handcycle. One of the more well-know designs, marketed under the trademark/designation "Freedom Ryder" weighed 58 pounds. Because the arms are not as large a muscle mass as the legs, weight is an important consideration in handcycle design, particularly for wheelchair athletes. However, because of the fundamental positioning of the rider in the recumbent-style handcycle, it is believed that aerodynamic and other limitations will still exist—no matter what gearing, materials and/or weight improvements are made to this type of cycle.

SUMMARY OF THE INVENTION

The present invention is directed toward a handcycle which supports the rider in a unique, modified prone body position on the cycle. It is believed that such a body position provides a more aerodynamic configuration than the standard recumbent-style handcycle, particularly in reducing wind resistance. Additionally, the modified prone position allows a downward stroke on the hand pedals of the pedal assembly, which is believed is more efficient, and provides the rider with greater leverage and power to move the handcycle.

According to the preferred form of the present invention, the rider is supported by the frame of the handcycle in a forward leaning ("modified prone") position, with the feet of the rider in straps above the rear axle, and the arms hanging generally downwardly toward a pedal assembly. The pedal assembly is generally at about the chest portion of the rider. This geometry increases the leverage that can be applied to rotate the hand pedals of the pedal assembly, thereby increasing the speed of the bicycle. Preferably, the central bar of the frame extends upwardly and forwardly to support the rider at an angle of between about 15 and 45 degrees, and more preferably at an angle of about 30 degrees, from the rear axle, although this can vary depending upon the size of the rider (e.g., height, arm length, torso size, etc.). Appropriate padding and supports can be provided along the mid-portion of the bar to support the chest of the rider at the proper angle.

The pedal assembly is mounted directly to the front fork assembly of the cycle, which allows the rider to crank and steer with the same component. A damper assembly connected between the front fork assembly and the frame of the cycle provides variation in dampening for front wheel stability in changing road conditions. The combination of the force exerted by the arms and the damping assembly allow the bicycle to be turned as appropriate, and prevents wobbling or instability, even at higher speeds. The gear shift and brakes are also nearby and easily accessible.

The pedal assembly is also adjustable which allows alternating stroke capability as well as synchronous stroke. One of the hand pedals is fixed to a plate of the pedal assembly by a pin, which can be removed and the hand pedal individually rotated 180 degrees into alignment with the other pedal. The hand pedals can thereby be oriented for synchronous or alternating stroke. It is believed that this gives greater efficiency and energy conservation. With terrain changes, the rider can adjust from aerobic (alternating stroke) to anaerobic (synchronous stroke) muscle work.

The present invention also includes carbon fiber framing which further reduces the over-all weight of the handcycle. Carbon fiber provides more flexibility, shape memory and is much lighter than steel.

Further features of the present invention should become apparent upon reviewing the following Specification and attached drawings.

DETAILED DESCRIPTION OF THE PREFERRED EMBODIMENT

Figure 1:
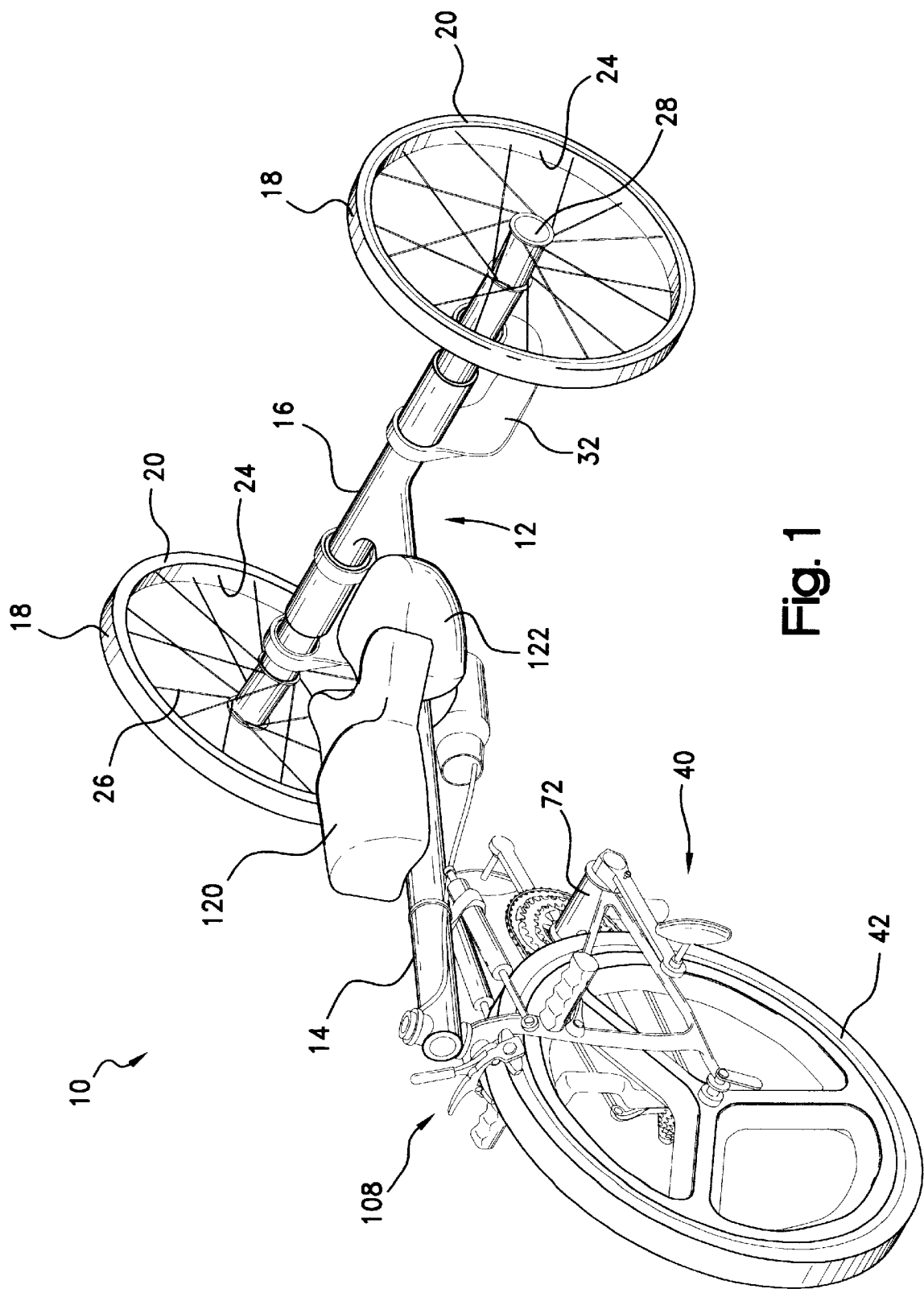
FIG. 1 is an elevated perspective view of a handcycle constructed according to the principles of the present invention.
Figure 2:
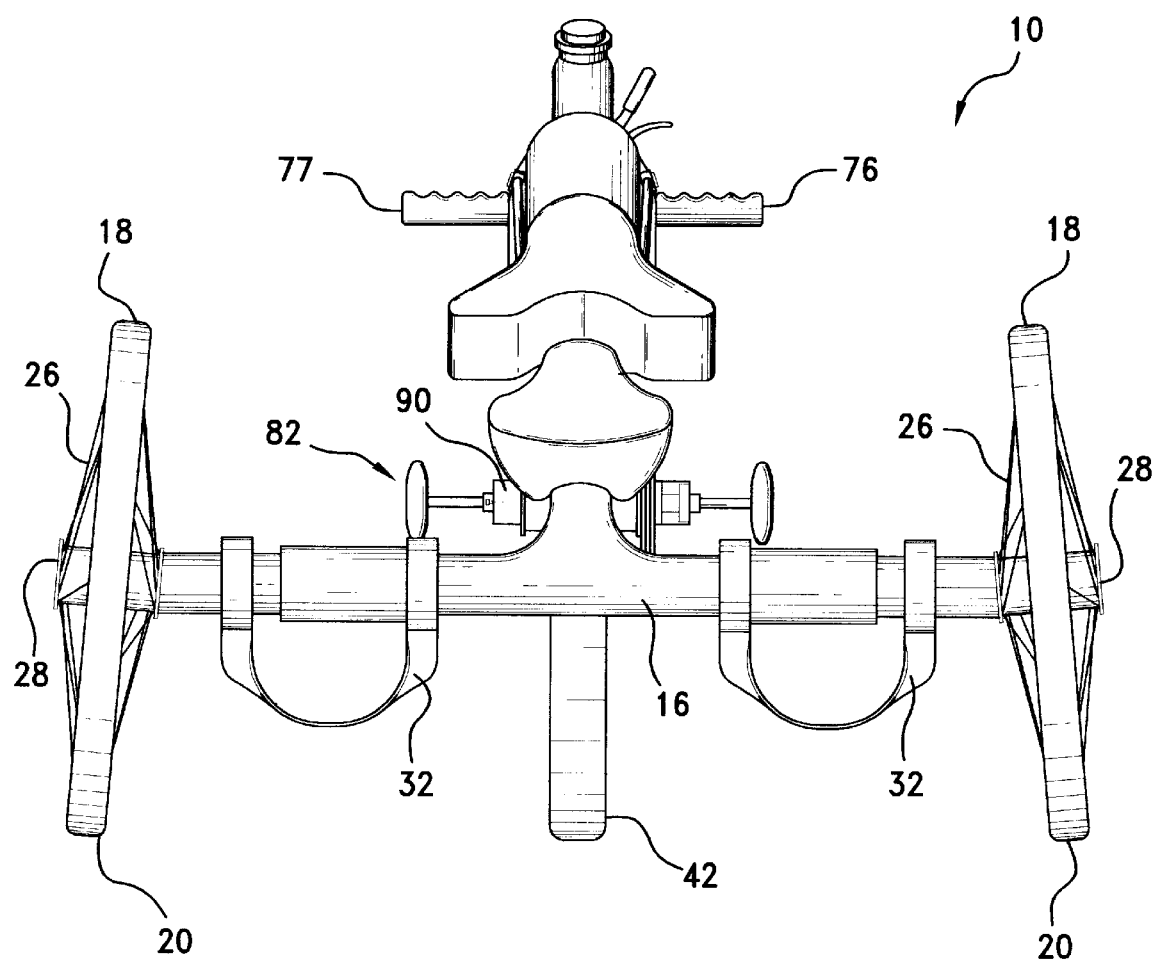
FIG. 2 is a rear view of the handcycle of FIG. 1.

With initial reference to FIGS. 1 and 2, a handcycle constructed according to the principles of the present invention is illustrated generally at 10. The handcycle 10 includes a frame, indicated generally at 12, including a central bar or rod 14. At one end of the central rod is a rear axle 16 extending perpendicular to the rod. The rear axle 16 is fixed to the rod 14 such as by epoxy or by other means. A pair of rear wheels 18 are rotatably fixed on either end of the rear axle 16. The wheels 18 are typical bicycle wheels, preferably with racing tires 20 mounted on a thin rim 24, and a series of spokes 26 securing the rim 24 to a central wheel hub 28. The wheel hub 28 is mounted to the rear axle 16 in a conventional manner, such as on an axle rod (not shown). Appropriate bearings (not shown) are also provided. A pair of straps or loops 32 can be hung from the rear axle 16 to support the rider's feet.

At the other, forward end of the central rod 14 is a downwardly-extending front fork assembly, indicated generally at 40, supporting a front wheel 42. As shown more clearly in FIGS. 3 and 4, the front fork assembly 40 includes a left fork arm 46 and a right fork arm 48, which extend downwardly on either side of the front wheel 42. The front wheel is also a typical bicycle wheel, preferably with a racing tire 50 mounted on a thin rim 52, and a series of spokes 54 securing the rim 52 to a central wheel hub 56. As indicated generally at 58, the upper end of the front fork assembly 40 is rotatably held within a bore, formed through the central rod 14. Appropriate bearings (not shown) are provided in the bore for smooth rotation of the fork assembly.

The fork assembly 40 includes fork support rods 62, 64 which also extend on either side of the front wheel 42 substantially perpendicular to the front fork arms 46, 48, and parallel to the road surface. The front or forward end of the fork supports 62, 64 are rotatably and removeably fixed to each end of axle 56 extending through the wheel hub of the front wheel 42. The fork supports are also fixed (e.g., epoxied) at the lower end of the front fork assembly, which intersect the fork supports 62, 64 at 66, somewhat rearwardly from the axle 56, with right fork support 62 being attached to right front fork arm 46, and left fork support 64 being attached to left front fork arm 48. The fork supports 62, 64 extend rearwardly to a pedal assembly, indicated generally at 70, and specifically to a sprocket hub 72 (FIG. 1) of the pedal assembly. Secondary fork support rods 74, 75 are also provided for supporting the pedal assembly 70 and extend from the front fork arms 46, 48 on either side of the front tire 42 to the sprocket hub 72. The secondary supports 74, 75 are also fixed (e.g., epoxied) to the front fork arms 46, 48 and the sprocket hub 72.

Small, outwardly-projecting handlebars 76, 77 (see also FIG. 2) can be affixed to the front fork arms 46, 48 (one to each fork arm) above the front axle 56 to facilitate controlling the bicycle, particularly on long downhill stretches.

The pedal assembly 70 for the handcycle is located beneath the central bar 14 and slightly rearwardly from the front wheel 42. The pedal assembly includes a sprocket 78 which is fixedly connected to an axle 80 extending through the sprocket hub 72. On one end of the axle 80, on the side opposite from the sprocket 78, is a first hand pedal, indicated generally at 82 (FIG. 4), having a pedal rod 83 rotatably connected to the axle 80 and a hand grip 84 rotatably mounted on the pedal rod 83. A second hand pedal, indicated generally at 86 (FIG. 3), is provided on the sprocket-side of the axle 80, and includes a pedal rod 87 fixedly connected to the axle and a rotatable hand grip 88.

Figure 4:
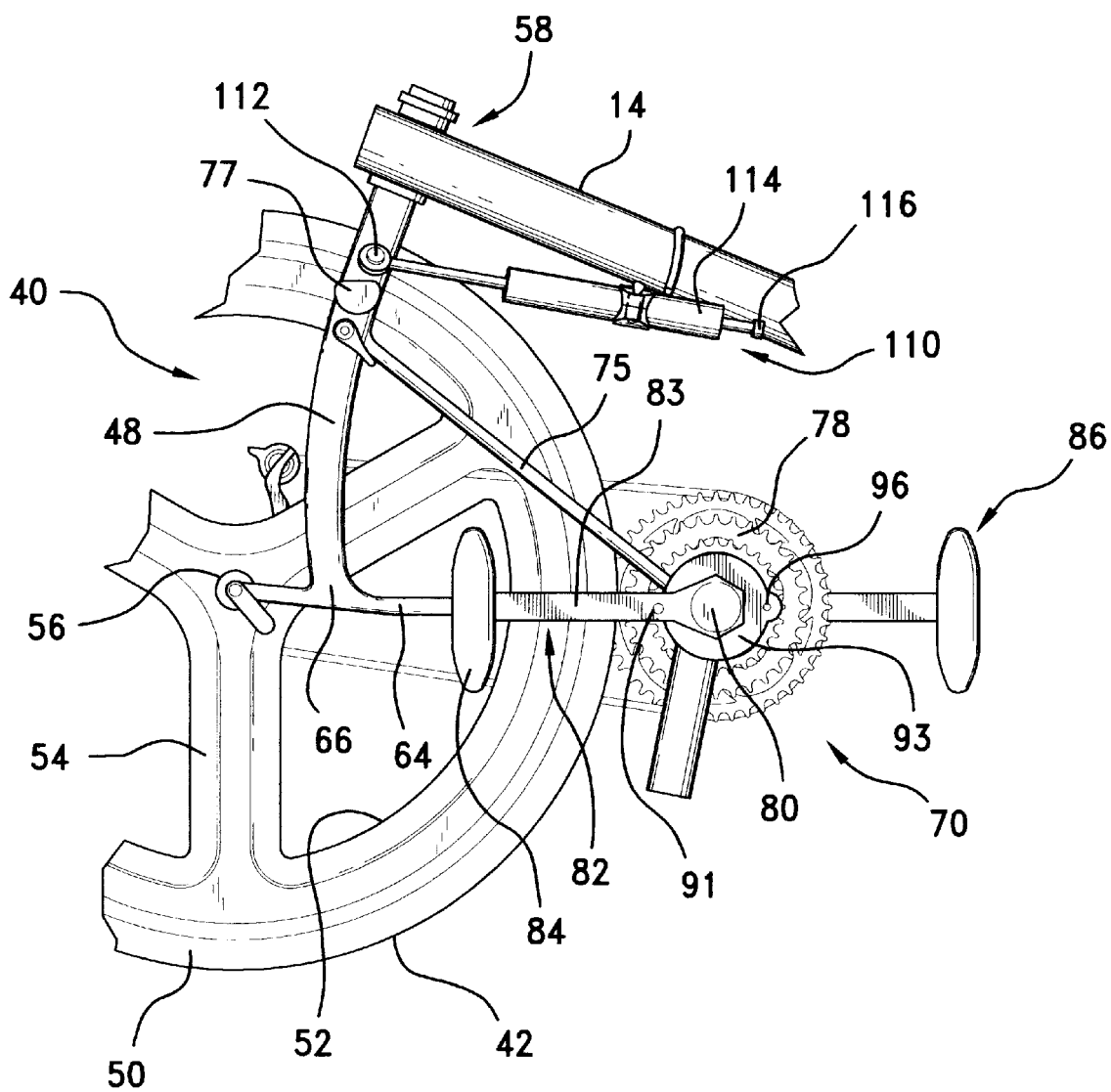
FIG. 4 is an enlarged left side view of the front portion of the handcycle in FIG. 3.
Figure 5:
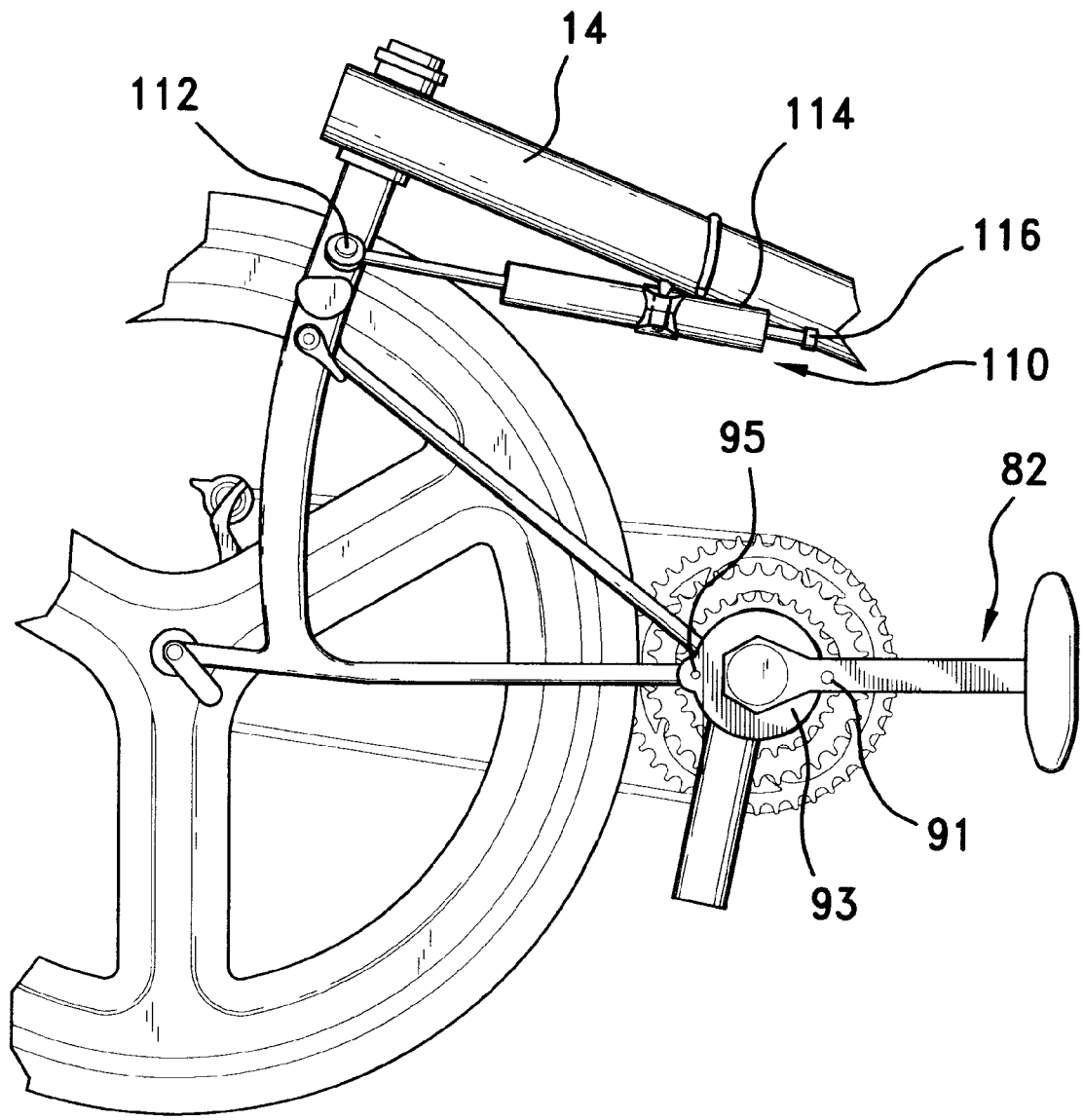
FIG. 5 is an enlarged left side view of the front portion of the handcycle, with the pedals shown in another orientation.

The first hand pedal 82 is fixed to a collar 90 (FIG. 2) rotatably mounted to the axle 80, and can be journaled relative to second hand pedal 86. A spring-biased pin 91 indexes the hand pedal 82 at the location of holes formed on a circular plate 93, which is adjacent to the pedal rod 83 and fixed to the axle 80. Two holes 95 (FIG. 5) and 96 (FIG. 4) are provided 180 degrees apart from each other on plate 93. As shown in FIG. 4, when the pin 91 is inserted into the first hole 95 in plate 93, the first hand pedal 82 extends in a direction opposite that of the second hand pedal 86, and thereby rotates on the axle 180 degrees out of synchronization from second hand pedal 86. As shown in FIG. 5, when pin 91 is locked in the second hole 96, the first hand pedal 82 extends in the same direction as second hand pedal 86, and rotates in conjunction therewith. The hand pedals can be disposed 180 degrees apart from one another (FIG. 3, 4), zero degrees from one another (FIG. 5), or in another appropriate location depending upon the location of the holes on the circular plate. The location of the two hand pedals can thereby be relatively changed, for example for aerobic activity or long-distance peddling.

Figure 3:
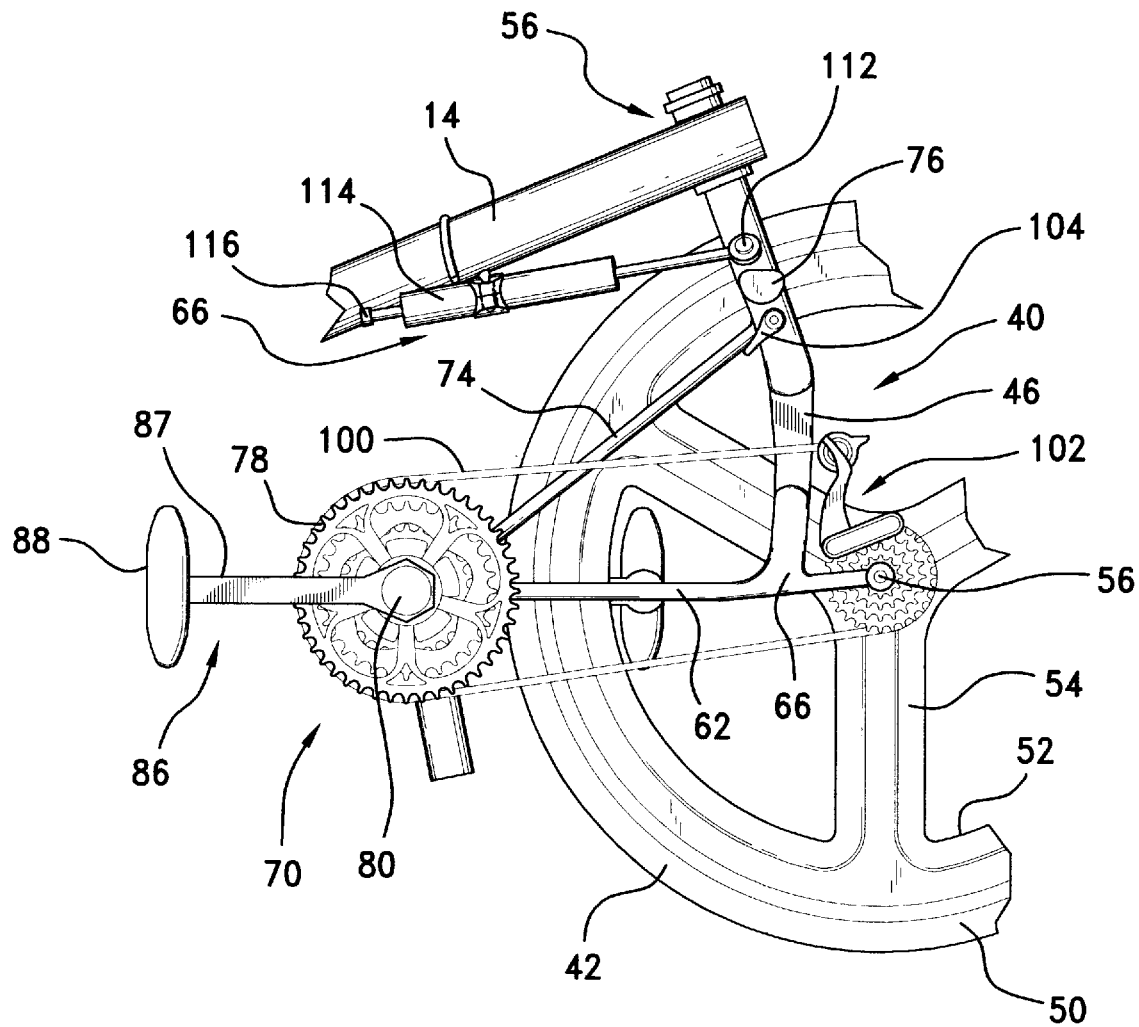
FIG. 3 is an enlarged right side view of a front portion of the handcycle, with the pedals shown in one orientation.

As shown in FIG. 3, a chain loop 100 is entrained around the sprocket 78 and extends to a derailer assembly, indicated generally at 102, mounted on the front axle 56. Derailer assembly 102 can be any commercial type of derailer assembly, which includes a front sprocket 103 mounted on front axle 56 and which forces the chain 100 to be entrained around one of the levels of gear teeth on sprocket 78 of pedal assembly 70 and/or front sprocket 103 on front axle 56. Appropriate gear shifts 104 for the derailer assembly 102 are mounted on the front fork arms 46, 48 or on one of the handlebars 76, 77 mounted to the front fork arms, and appropriate cables (not shown) can be run between the shifts and the derailer, as is well known.

An appropriate bicycle brake assembly, indicated generally at 108 in FIG. 1, can also be mounted on the front fork arms 46, 48 for controlled braking of the handcycle. The hand brake (gripping) portions of the assembly can also be mounted on one or both of the front fork arms, as should be appreciated by one skilled in the art.

A damper mechanism, indicated generally at 110 in FIGS. 3–5, operates between the front fork assembly 40 and the central rod 14 to prevent the fork assembly from vibrating and wobbling at high speeds. The damper assembly can be a simple hydraulic shock absorber (e.g., a motorcycle-type shock absorber), with the first end 112 (the rod end) fixed to one of the front fork arms 46, 48, and a second end 114 (the cylinder end) fixed to the central rod 14. The first end 112 is preferably fixed to the side of one front fork arm, while the second end 114 is fixed underneath the central rod. Appropriate fasteners can be used to fix the shock absorber to the front fork arm and the center bar. The shock absorber can be mounted to only one fork arm, however it is preferred that a pair of damper assemblies be used, one mounted to each fork arm. Also preferably, the shock absorber is adjustable (i.e., the spring force can be adjusted) by knob 116 such that the vibration of the bicycle can be adjusted at different speeds. The damper assembly allows the front fork assembly to be rotated relative to the central rod, but generally dampens out fast movements, fluctuations and wobbling.

The central bar 14, rear axle 16 and fork assembly 40 are preferably formed from a light-weight, high strength material, such as carbon fiber.

The central bar 14 of the handcycle is preferably mounted at an angle from the rear axle 16 to the front fork assembly 40 such that the rider is in a forward leaning ("modified prone") position, with the feet of the rider in the straps 32 above the rear axle, and the arms hanging generally downwardly toward the pedal assembly 70. The pedal assembly is generally at about the chest portion of the rider, which it is believed provides maximum leverage for the rider. Preferably, the central bar 14 extends upwardly and forwardly from the rear axle to support the rider at an angle of between about 15 and 45 degrees, and more preferably at about a 30 degree angle, relative to the road surface, although this could vary depending upon the size of the rider (e.g., height, arm length, torso size, etc.). As shown in FIG. 1, appropriate padding and supports 120 can be provided along the mid-portion of the bar to support the chest of the rider at the proper angle. A seat 122 can also be provided toward the rear of the central bar 14 to support the rear end of the rider. The padding and support 120 and seat 122 are conventional, and are attached to the central bar using appropriate fasteners.

The rider is supported along the central bar 14 such that the arms of the rider extend downwardly toward the road surface, and can easily grasp the hand pedals 84, 88 of the pedal assembly. The rider rotates the hand pedals to power the bicycle, with the gear shift 104 and brakes 108 being nearby and easily accessible. This geometry increases the leverage that can be applied to rotate the hand pedals, thereby increasing the speed of the bicycle. In addition, the rider can easily turn the bicycle by adjusting pressure on the arms during rotation of the pedals of the pedal assembly, that is urging one hand pedal more forwardly than the other during rotation of the hand pedals. There is no leaning that is required to turn the bicycle, although leaning can of course be important in negotiating curves at high speeds. The combination of the force exerted by the arms and the damping assembly allow the bicycle to be turned as appropriate, but prevent wobbling or instability, even at high speeds.

As such, the present invention provides a handcycle which supports the rider in a modified prone body position on the cycle. It is believed that such an orientation provides a more aerodynamic configuration than the standard recumbent-style handcycle, particularly in reducing on wind resistance. Additionally, it is believed the downward stroke of the pedal assembly is more efficient, and provides the rider with greater leverage and power to move the handcycle The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A handcycle, comprising:
   a frame including a rear axle and a central support rod connected to and extending forwardly and upwardly from a rear end of the frame for support of a rider;
   a front fork assembly having an upper end rotatably supported by a forward end of the central support rod and a lower end connected to a front axle;
   a front wheel rotatably mounted to the front axle, and a pair of rear wheels rotatably mounted to the rear axle, said front and rear wheels being supported on a road surface such that the central support rod of the frame extends from the rear axle to the front fork assembly to support the rider at an angle of between about 15 and 45 degrees; and
   a pedal assembly supported by the front fork assembly beneath the central rod, said pedal assembly including a pair of hand pedals connected to a pedal axle rotatably supported within a sprocket hub and a chain loop operatively connecting the hand pedals with the front wheel, wherein the hand pedals can be rotated to rotate the front wheel.

2. The handcycle as in claim 1, wherein said pedal assembly is supported on a pair of fork supports, each of the fork supports extending rearwardly from the front axle on either side of the front wheel to the sprocket hub.

3. The handcycle as in claim 2, further including a pair of secondary support rods supporting the pedal assembly, the secondary support rods extending from the front fork assembly to the sprocket hub on either side of the front wheel.

4. The handcycle as in claim 1, wherein one of the hand pedals is indexed on a plate fixed relative to the pedal axle, and can be journaled relative to the other hand pedal.

5. The handcycle as in claim 4, wherein the one hand pedal can be indexed on the plate in a first orientation where the hand pedals extend in the same direction and are cranked synchronously, and a second orientation where the hand pedals extend opposite from one another and are cranked alternatingly.

6. The handcycle as in claim 1, wherein the central support rod of the frame extends from the rear axle to the front fork assembly at an angle of 30 degrees.

7. The handcycle as in claim 1, wherein a pair of support straps are provided along the rear axle for support of the rider's feet.

8. The handcycle as in claim 1, wherein the pedal assembly is supported rearwardly from the front wheel and between the central support rod and the road surface, with the hand pedals disposed such that a rider supported on the central support rod reaches downwardly around the central support rod to grab the hand pedals.

9. The handcycle as in claim 1, wherein the sprocket hub supports the pedal axle between the central support rod and the road surface.

10. A handcycle, comprising:
    a frame including a rear axle and a central support rod connected to and extending forwardly from a rear end of the frame;
    a foot support device toward the rear end of the frame which can support of the feet of a rider;
    a front fork assembly having an upper end rotatably supported by a forward end of the central support rod and a lower end connected to a front axle;
    a front wheel rotatably mounted to the front axle, and at least one rear wheel rotatably mounted to the rear axle, said front and rear wheels being supported on a road surface such that the central support rod of the frame extends forwardly and upwardly relative to the road surface from the rear axle to the upper end of the front fork assembly, and a torso pad along the central rod which can support of the torso of the rider; and
    a pedal assembly including a pair of hand pedals fixed to a pedal axle rotatably supported between the central rod and the road surface, said hand pedals being operatively connected to the front wheel, wherein the hand pedals can be rotated by hand when the rider is supported against the torso pad to rotate the front wheel.

11. The handcycle as in claim 10, wherein the pedal assembly is disposed beneath the central rod of the frame.

12. The handcycle as in claim 11, wherein the pedal assembly is supported rearwardly from the front wheel and between the central support rod and the road surface.

13. The handcycle as in claim 12, wherein said front and rear wheels are supported on a road surface such that the central support rod of the frame extends from the rear axle to the front fork assembly at an angle of between about 15 and 45 degrees.

14. The handcycle as in claim 13, wherein said pedal assembly is supported on a pair of fork supports, each of the fork supports extending rearwardly from the front axle on either side of the front wheel to a sprocket hub rotatably supporting the pedal axle.

15. The handcycle as in claim 10, wherein said pedal axle for the hand pedals is rotatably supported within a sprocket hub and a chain loop operatively connects the hand pedals with the front wheel.

16. The handcycle as in claim 10, wherein the hand pedals include hand grips rotatably connected to respective pedal rods.

17. The handcycle as in claim 10, further including foot support device on the rear axle for support of the feet of the rider.

18. The handcycle as in claim 10, wherein the pedal assembly is supported rearwardly from the front wheel and between the central support rod and the road surface, with the hand pedals disposed such that a rider supported on the torso pad reaches downwardly around the central support rod to grab the hand pedals.

19. The handcycle as in claim 10, further including a pair of rear wheels rotatably mounted on the rear axle.

20. A handcycle, comprising:
- a frame including a rear axle and a central support rod connected to and extending forwardly from a rear end of the frame, the rear axle including a foot support device for support of the feet of a rider;
- a front fork assembly having an upper end rotatable supported by a forward end of the central support rod and a lower end connected to a front axle;
- a front wheel rotatable mounted to the front axle, and at least one rear wheel rotatably mounted to the rear axle, said front and rear wheels being supported on a road surface such that the central support rod of the frame extends forwardly and upwardly relative to the road surface from the rear axle to the upper end of the front fork assembly, and a torso pad along the central rod for support of the torso of the rider; and
- a pedal assembly including a pair of hand pedals fixed to a pedal axle rotatably supported between the central rod and the road surface, said hand pedals being operatively connected to the front wheel, wherein the hand pedals can be rotated by hand when the rider is supported against the torso pad to rotate the front wheel, wherein one of the hand pedals is indexed on a plate fixed relative to the pedal axle, and can be journaled relative to the other hand pedal.

21. The handcycle as in claim 18, wherein the one hand pedal can be indexed on the plate in a first orientation where the hand pedals extend in the same direction and are cranked synchronously, and a second orientation where the hand pedals extend opposite from one another and are cranked alternatingly.

* * * * *